Nov. 19, 1957 R. TAYLOR 2,813,987

DIGITAL VOLTAGE DIVIDER NETWORK

Filed April 12, 1955 4 Sheets-Sheet 1

INVENTOR.

BY RICHARD TAYLOR

ATT'Y

Nov. 19, 1957 R. TAYLOR 2,813,987

DIGITAL VOLTAGE DIVIDER NETWORK

Filed April 12, 1955 4 Sheets-Sheet 2

INVENTOR.
RICHARD TAYLOR
BY [signature] ATT'Y

Nov. 19, 1957

R. TAYLOR 2,813,987

DIGITAL VOLTAGE DIVIDER NETWORK

Filed April 12, 1955

4 Sheets-Sheet 3

INVENTOR.
BY RICHARD TAYLOR
ATT'Y

DIGITAL VOLTAGE DIVIDER NETWORK

Filed April 12, 1955

INVENTOR.
RICHARD TAYLOR
BY
[signature] ATT'Y

United States Patent Office 2,813,987

Patented Nov. 19, 1957

2,813,987

DIGITAL VOLTAGE DIVIDER NETWORK

Richard Taylor, Binghamton, N. Y., assignor to International Business Machines Corporation, New York, N. Y., a corporation of New York Application April 12, 1955, Serial No. 500,973

7 Claims. (Cl. 307—155)

This invention is concerned with a voltage divider network, more specifically, a network that produces, in a digital manner, a signal that varies according to a predetermined function.

A network according to this invention may be used with A. C. or D. C., and it is an object of this invention to provide a signal which may vary in accordance with an arbitrary function in a very precise manner.

Another object of this invention is to provide an improved resistance network which has a constant impedance as seen from the output side thereof.

A further object of this invention is to provide an improved resistance network that has switching means included therein so as to produce in a digital manner a predetermined signal according to a desired function. Also included in the network there is a means for providing continuous interpolation between levels of the digital steps.

Briefly, this invention includes a digital voltage divider network having a plurality of impedances therein, such network being means for producing a signal that varies according to a predetermined function. The network comprises means for supplying power to said network and circuit means for switching said impedances across said power supply to provide changes in said signal by steps. The network also comprises an interpolating potentiometer and means for employing acid potentiometer to obtain a smooth transition from one step to the next of said signal.

These and other objects and principles of the invention are set forth herein and will be more clearly brought out in connection with an embodiment of the invention which is described below and illustrated in the drawings, in which:

Figs. 1*a* and 1*b* are a complete circuit diagram illustrating a system according to the invention;

Figure 1A:
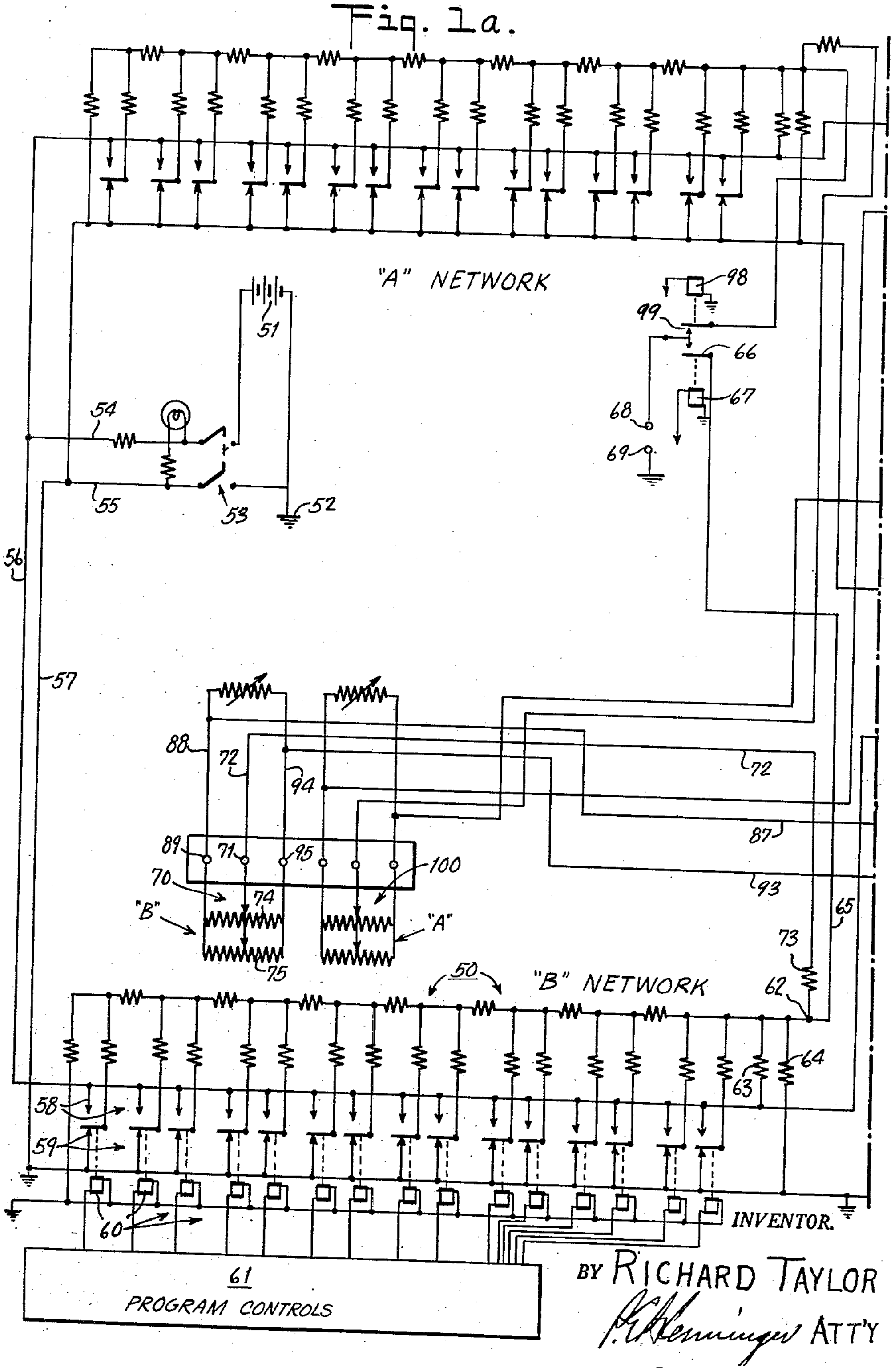
Figure 1B:
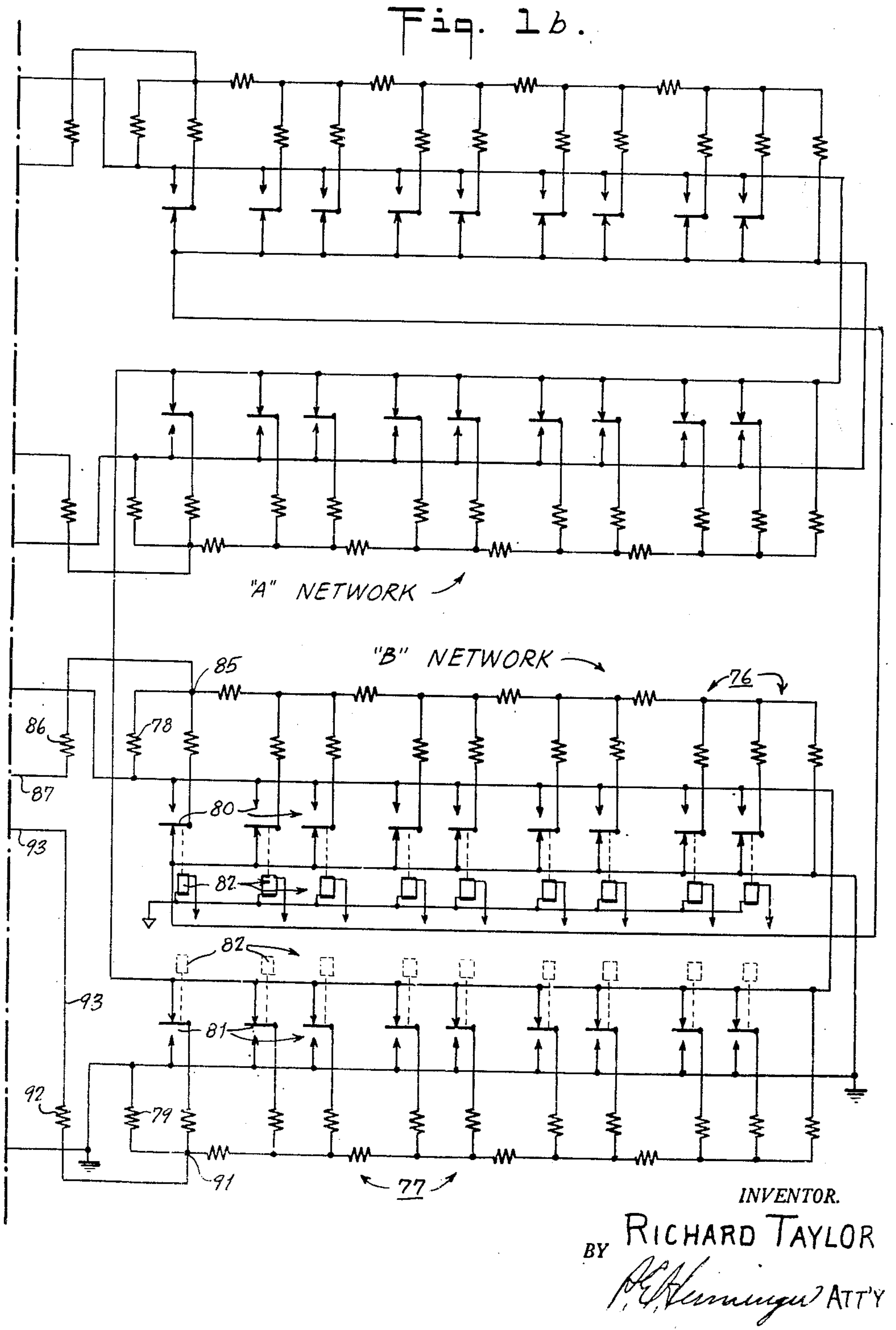

The complete system according to this invention is illustrated in Figs. 1*a* and 1*b*. As there indicated, the system includes two identical voltage divider portions or halves which are labeled "A" network and "B" network. As will be pointed out more fully below, the use of two identical networks, as shown, is to permit at least one network to be connected to an output terminal at all times. Switching may take place in a network when it is disconnected. Consequently, the detailed explanation for the system will be limited to the "B" network only, and it will be clear to any one skilled in the art that the same explanation applies exactly to the "A" network.

Within the "B" network there are three similar individual networks included, one being that illustrated in Fig. 1*a*, while the other two are shown in Fig. 1*b* at the lower half thereof where the legend "B" network is applied. Each of these three resistance networks is basically the same and may be explained by reference to various of the other figures. It is pointed out that the network in each case is employed as a voltage divider and consequently has its input connected across a source of power supply which might be either A. C. or D. C., but which is in this instance illustrated as being a D. C. supply.

Figure 3:
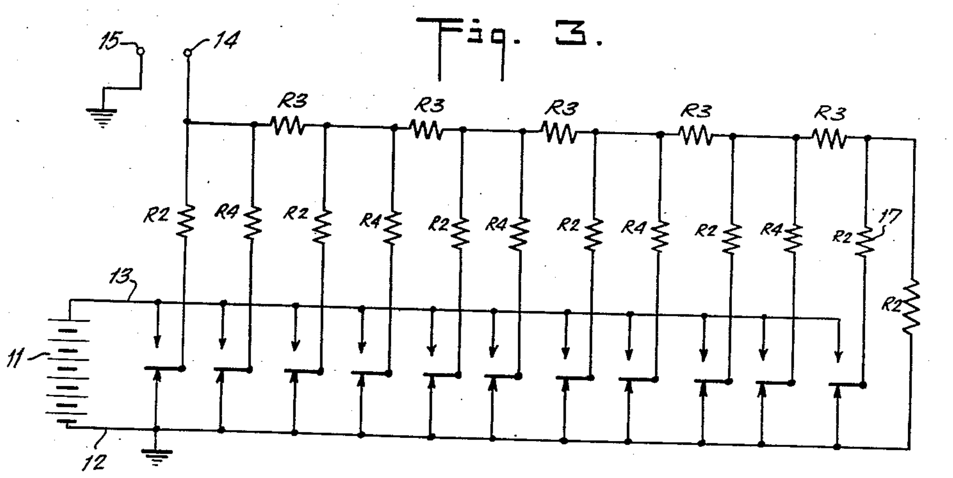
Fig. 3 is a simplified circuit diagram showing one voltage divider network according to the invention.

Referring to Fig. 3 it is pointed out that there is there illustrated a single voltage divider network that is like any of the three networks included in the "B" network being described. The network shown in Fig. 3 includes a D. C. power supply source 11 which has one side connected to ground via a common lead or wire 12. The other side of the D. C. source or battery 11 is connected to a lead 13 which has a series of switch contacts connected thereto as shown. The network of resistors which may be variably switched across the D. C. source 11 includes a plurality of resistors which have indications of their relative resistance value by means of the markings R2, R3 and R4. It is pointed out that while the actual values of these resistors may vary, the ratio of relative resistance values must be maintained to a close degree, in the same ratio as indicated, i. e. in the ratio of 2:3:4. The reasons for this ratio will appear presently.

The output of the network is illustrated as a pair of terminals 14 and 15 which are connected in the circuit as illustrated, the terminal 15 being connected to ground. It is pointed out that the signal that is produced at the output terminals 14 and 15 may be digitally varied by switching the various resistors to produce steps of signal voltage at the output terminals 14 and 15. Thus steps of voltage may be had which follow a series of fractions of the source of voltage (battery 11) beginning with ½ at the left hand resistor R2 which may be given a reference number 16, and ending with a resistor 17 which is the next to the last resistor at the right hand end as illustrated in Fig. 3. The fractional steps obtainable are ½, ¼, ⅛, 1/16, etc. down to any desired number of reductions depending upon the extent to which the network is carried. As will be explained below, by combinations of switching, any given variations in the output signal may be produced in a digital manner. The unit or smallest digital change is that fraction of the D. C. supply 11 as determined by the last step, i. e. switching of resistor 17 in the Fig. 3 illustration.

Figure 2:
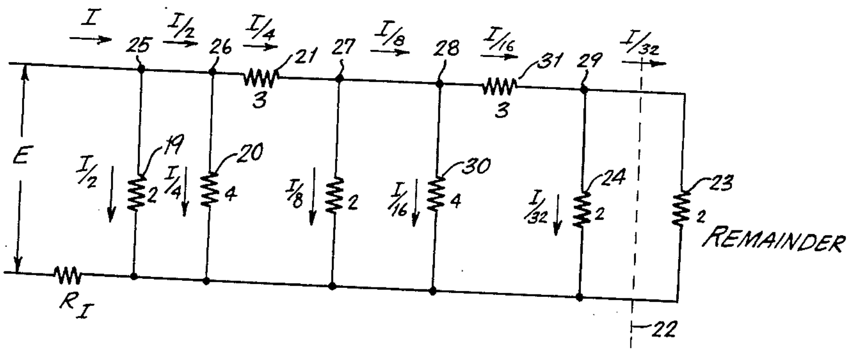
Fig. 2 is an illustrative network for explaining the principles of the invention.

In order to explain how the voltage divider network described in connection with Fig. 3 above operates, reference may be had to Fig. 2 where an equivalent circuit is illustrated and wherein the division of currents over a resistance network such as that employed in Fig. 3 is shown. It will be noted that there are resistors 19, 20 and 21, which, as indicated in Fig. 2, have relative resistance values in the ratio of 2:4:3 respectively. The arrangement of resistors 19 and 20 are in parallel, followed by a series resistor 21 connecting the remainder of the network. This grouping of three resistors is repeated as many times as desired to reduce the size of the fractions of the total current which the succeeding resistors of the network will carry. At the termination of the network, as is indicated by a dashed line 22, a single resistor 23 is connected in parallel with the end of the network, and constitutes a remainder as indicated. It will be noted that the resistance value of resistor 23 has a relative value of 2, so that the current will divide equally between the remainder resistor 23 and the last parallel resistor 24 of the network. It will be noted that with a voltage "E" applied to the network as indicated in Fig. 2, the current flow will divide in equal parts at succeeding points 25, 26, 27, 28 and 29 in the network. Such division of the current flow is indicated in Fig. 2, and it will be observed that the first division sends half the current each direction, while the next division sends half of the remaining current, i. e. ¼ of the current in each direction, and again at point 27 the division sends half of the ¼, i. e. ⅛ of the current in each direction, and so on down to the final point 29 where 1/32 of the total current is flowing in each of the remaining branches of the network from this point. It is pointed out that it is the relative resistance values of the resistors which create this current division, and it may be readily calculated that the relative resistance value of each path (for the two paths that exist at each of the points 25—29) is equal. For example, at point 29, each of the two resistors 24 and 23 has an equal resistance value in the ratio of 2:2. Then, at point 28, the one path going vertically downward and through a resistor 30 has a resistance value in the ratio of 4 while the other path traveling through a resistor 31 and then the parallel resistors 23 and 24 has a total resistance value in the ratio of 4. The latter is true since the resistors 23 and 24 in parallel create a combined resistance having a ratio value of 1, which is then added in series with the resistor 31 having its ratio value of 3, to provide a total ratio resistance value of 4 for this path. Consequently, the current again divides equally. The same situation will be found to exist at each of the division points 25—29 as stated above.

Now, by making use of the theorem of reciprocity, the positions of the voltages and current may be reversed so that the voltage output of a network when connected as illustrated in Fig. 3 may be found to follow the same fractional division of the total power supply voltage as found in the current flow divisions of the example illustrated in Fig. 2. Consequently, the output of the network as obtained at terminals 14 and 15 of Fig. 3 is in fractional steps. These steps may be combined as desired to provide voltages in steps anywhere from the smallest fraction, as determined by the extent to which the network is carried, to the maximum voltage as applied to the network. In other words, the parallel resistors R2 and R4 are normally connected to the low side of the battery 11. Then the switch for any of these resistors will connect that resistor to the high side of the battery 11, and the voltage corresponding to that resistor will appear at the output terminals 14 and 15, independent of the operation of any other resistor in the network.

Figure 5:
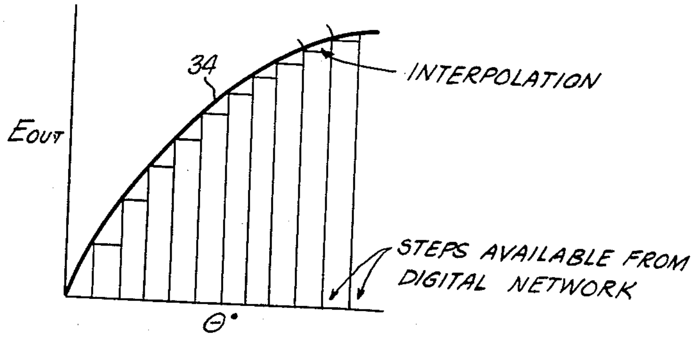
Fig. 5 is a graph illustrating a non-linear function as obtainable from a system according to the invention.

In order to interpolate the signal from one step to the next as digitally produced according to the output of a switching voltage divider network such as that illustrated in Fig. 3 and described above, a potentiometer might be employed. However, when the output signal is varied at some function other than a straight line, the size of succeeding steps of signal change varies. Therefore, the use of a potentiometer to interpolate from one step to the next presents the problem of changing the size of the voltage to be applied across the potentiometer, as the size of the steps of voltage change are varied. This condition is illustrated by ag raph in Fig. 5. It will be observed that the steps of voltage change for a non-linear curve, e. g. curve 34, change to a substantial extent from the left hand portion of curve 34 to the right hand portion thereof. In view of this situation a circuit arrangement has been discovered whereby a potentiometer may be employed to interpolate from one step of the signal voltage (as digitally created) to the next, by applying a variable voltage across the potentiometer in accordance with the size of each individual step of voltage change.

Figure 4:
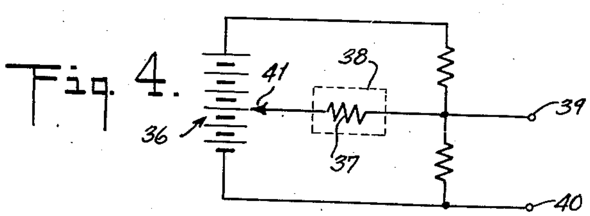
Fig. 4 is a simplified schematic diagram illustrating the principles of the invention.

To appreciate the manner in which this is accomplished, reference is had to Fig. 4 where there is illustrated a schematic simplified circuit showing the operation of a digital voltage divider network. Referring to Fig. 4 it will be noted that there is a voltage source 36 which corresponds to battery 11 in Fig. 3, and which has connected thereto a single constant impedance resistor 37 which is shown in a dashed line box 38 to indicate that it represents a network such as that illustrated in Fig. 3. The output of this circuit then will be had at terminals 39 and 40 and may be a signal varying from a minimum to a maximum voltage, depending upon the connection for the variable network 38 as indicated by an arrow 41. Now, it will be appreciated that in order to interpolate between variable steps of voltage change as produced at the output terminals 39 and 40, there can be no simple connection of a potentiometer in the circuit. However, in order to add the output of a potentiometer to the output of the network, so as to have a smooth transition from one voltage to the next in the steps as produced by the digital network, an arrangement as illustrated in simplified schematic form in Fig. 6 may be employed.

Figure 6:
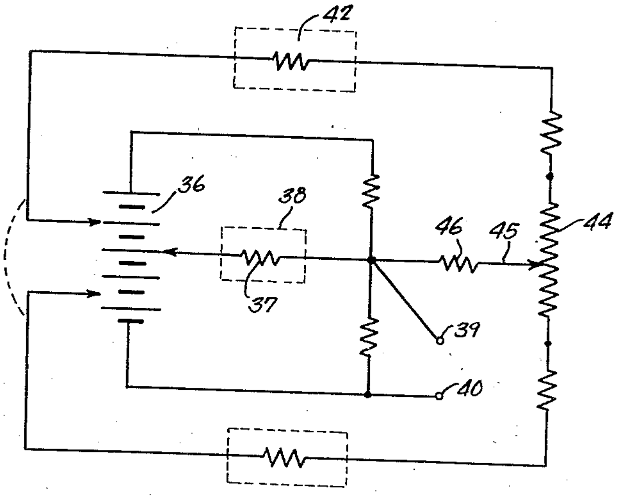
Fig. 6 is another schematic diagram illustrating the principles of operation for the complete system according to the invention.

Referring to Fig. 6 it will be noted that the same reference numbers are used to indicate the same elements as were shown in Fig. 4. The voltage supply 36 has the same digital network 38 which includes a constant impedance 37 as shown in Fig. 4. There is also included output terminals 39 and 40 like the Fig. 4 circuit. In addition, there is included two separate digital networks 42 and 43 which have their outputs connected at either end of a potentiometer 44. The potentiometer 44 has a slider 45 thereon which is directly connected via a resistor 46 to the output terminal 39. In this manner the two ends of the potentiometer 44 may have a predetermined amplitude of voltage applied thereto so as to correspond with the size of the steps as produced from the digital network 38. Consequently, the slider 45 may be moved from one end to the other of the potentiometer, and add to the signal as produced in one step of the output of network 38, a smoothly increasing voltage which terminates with the potential level of the next succeeding step of the digital network 38.

Referring to Figs. 1*a* and 1*b*, and limiting the explanation to the "B" network, it is now pointed out that there is a digital signal generating network 50 which corresponds to the network 38 of Fig. 6. Network 50 has connected across its inputs a D. C. power supply 51 that has one side thereof grounded as indicated at 52. The power supply source, or battery 51, is connected via a double-poled, single-throw switch 53 and a pair of wires 54 and 55, which may be continued via wires 56 and 57 respectively, to a series of contacts 58 and 59 of relays 60.

In order to actuate the relays 60, there is any desired type of program control such as that illustrated by a box 61. It will be readily appreciated that the program for controlling relays 60 may take various forms, e. g. a punch tape or a stack of punch cards punched in sequence, and, as indicated above in connection with Fig. 3, by switching various combinations of the relay contacts, the output of the network 50 may be varied in any desired manner by steps which have a minimum fraction equal to 1/32768 in the network illustrated in Fig. 1*a*.

The output for this network 50 is the potential created at a point 62, relative to ground. It will be noted that there are a pair of resistors 63 and 64 which are connected across the D. C. supply, but which have a relatively high resistance value and are for the purpose of determining the voltage range of the output signal. The output signal as created at the point 62 is carried via a wire 65 to switch contacts 66 of a relay 67, and then from the other side of the switch 66 when it is closed to an output terminal 68. Another output terminal 69 is connected to ground as illustrated.

In order to add the output of a potentiometer to the voltage divider network 50 for creating smooth transition or interpolation in a manner like that described above in connection with the schematic showings, there is a potentiometer 70 that is indicated as a "B" potentiometer, and that has a pair of resistance windings 74 and 75 in parallel with two sliders connected together for the additional reliability thereof. A central connection 71 leads from the sliders of the potentiometer 70 via a wire 72 and a resistor 73 to the output signal point 62. In this manner the voltage as taken from potentiometer 70 is added to the output voltage from the signal network 50 and both are carried to the output terminal 68 via the wire 65 and switch contacts 66.

In order to obtain a variable potential gradient across the potentiometer, there are two networks employed which are illustrated in Fig. 1*b* and have the reference numbers 76 and 77. One of these networks is connected to each end of the potentiometer 70 as indicated in the schematic showing of Fig. 6. However, since the network connected to one end of the potentiometer 70 would be able to vary the voltage applied to that end from zero to the full voltage as derived from source 51, while the network connected to the other end of the potentiometer 70 could vary the voltage from the full positive value of the potential source 51 to zero, a negative potential gradient could be applied to the potentiometer. Since in the example shown only positive gradients are desired, the first step for each of the networks 76 and 77 is permanently wired as witness a resistor 78 in network 76 and a resistor 79 in the network 77. In this manner when the switch contacts are in the illustrated positions, one half of the potential of battery 51 is applied to each end of the potentiometer 70 and consequently the voltage gradient is zero. Now, by switching various ones of sets of contacts 80 and 81 in any desired combination, the voltage gradient applied across potentiometer 70 may be varied in predetermined steps from zero to substantially the full potential supply as produced by battery 51. If it should be desired to produce negative as well as positive gradients, the resistors 78 and 79 would be connected to contacts such as those illustrated at 80 and 81, respectively.

It will be observed that the switch contacts 80 and 81 are controlled by a set of relays 82, which are individually controlled in accordance with a predetermined schedule as set up by the program controls 61. It is pointed out that although the connections are not shown the relays 82 will be controlled, like relays 60, by the program controls 61.

The networks 76 and 77 are connected oppositely across the source voltage 51. The output of the network 76 may be traced beginning at a point 85 (corresponding to output point 14 in Fig. 3) and going via a resistor 86 and a wire 87 to a wire 88 that connects an end point terminal 89 of the potentiometer 70 to the circuit. The other network 77 may have its output traced in a similar manner beginning at a point 91 and going to one end of a resistor 92 via a wire 93 and another wire 94 to a terminal 95. The resistors 86 and 92 are included in series with the potentiometer 70 merely to reduce the voltage across the potentiometer and thereby reduce the value of the potentiometer output resistor 73 that is necessary.

It is to be noted that a convention is employed in the circuit as illustrated in Figs. 1*a* and 1*b*. The convention shows all relay contacts in the position they have for a de-energized condition of the relay. It will be observed that the various combinations of switching operations which may be performed are all to be controlled in any desired manner, the details of which form no part of the present invention. Such control will be had via a program control or the like as illustrated by the box 61 in Fig. 1*a*, and the relay coils for relays 82 of the "B" networks 76 and 77 are likewise controlled by the program-control arrangement 61.

It is to be emphasized that the "A" and "B" networks are identical, and further that they will be connected to the output of the system (output terminals 68 and 69) in sequence. In other words, as an example, the "A" network will be connected to the output followed by the connection of the "B" network to the output at the same time as the "A" network is still connected. Then, the "A" network will be disconnected from the output and switched to the next signal, while the "B" network remains connected to the output. Then, the "A" network will be connected again to the output, while the "B" network remains. Thereafter the "B" network will be disconnected and switched, so that switching transients will be always avoided at the output of the entire system.

Referring to Fig. 1*a*, there is illustrated the circuit for accomplishing the sequential switching just described. This circuit includes the relay 67 having switch contact 66, as well as a relay 98 for the "A" network, having contacts 99 controlled thereby. It will be appreciated that by including the control circuits for relays 98 and 67 in the program control, the step by step sequential switching just described above, may be had. For example, by energizing relay 98 to close its contacts 99, the "A" network output will be applied to the terminal 68. Then, while these contacts 99 are still closed, relay 67 will be energized to close its contacts 66 so that both the output from "A" network and output from "B" network are connected in parallel to output terminal 68. Then, relay 98 will be de-energized, which will open the contacts 99, leaving only the output of "B" network connected to the output terminal 68. During this latter time, switching will take place for the "A" network to set up the next step of signal voltage for its output. Then relay 98 will be again energized, closing its contacts 99 to apply the new signal output from "A" network (together with the remaining output from "B" network) to the output terminal 68. Now, the next operation will be to de-energize relay 67, opening its contacts 66 and so leaving only the new output of the "A" network connected to output terminal 68. While contacts 66 are open, the "B" network is switched, under control of its relays 60 and 82, to the next step of output signal. Then relay 67 will again be energized to close contact 66 and apply the new signal output from "B" network to terminal 68, in conjunction with the remaining output from "A" network. Such operation will continue step by step until the maximum desired output is reached.

Interpolation between steps of signals is effected by causing potentiometers 70 and 100 to be driven from one extreme position to the other, during the interval of time that the network with which it is associated is connected to the output. It will be appreciated that the potentiometers 70 and 100 are preferably in the form of a continuous winding on a circular support so that the wiper arms may repeatedly be moved from one end of the potentiometer resistance winding to the other, while continuously rotating them for more than one revolution.

It will be appreciated that while no relays have been shown in connection with the "A" network, they have been omitted for convenience only. It is contemplated that there will be relays (not shown) for actuating all of the switches in the "A" network in a substantially identical manner as the corresponding switches in the "B" network.

While a specific embodiment has been set forth in accordance with the applicable statutes, this is not to be taken as in any way limiting the invention, but merely as being descriptive thereof.

What is claimed is:

1. A digital voltage divider network having a plurality of impedances therein for producing a signal varying according to a predetermined function comprising means for supplying power to said network, circuit means for switching said impedances across said power supply to provide a change in said signal including an interpolating potentiometer for making a smooth transition between digital steps of said signal, and means for applying a variable voltage across said potentiometer in accordance with the size of the change in said signal, said last named means including a pair of voltage divider networks and circuit means including a slider on said potentiometer for adding the output of the potentiometer to said signal in order to obtain the smooth transition between steps of change of said signal.

2. A digital voltage divider network having a plurality of resistors therein for producing a signal varying according to a predetermined function comprising means for supplying power to said network, said power supply means having a high side and a low side, circuit means for connecting said resistors in a series-parallel network including a plurality of switches for connecting one end of each parallel resistor to said low side or to said high side alternatively, the other end of each said parallel resistors being connected to an output circuit, an interpolating potentiometer, means for applying a variable voltage across said potentiometer in accordance with the change in said signal, said last named means including two voltage divider networks having the output of each connected to one end of said potentiometer, said last named networks having their inputs oppositely connected across said power supply, and circuit means including a slider on said potentiometer for adding the output of the potentiometer to said signal as changed in order to interpolate between steps of signal change and provide a smooth output signal that is accurately determined in a digital manner.

3. A digital voltage divider network having a plurality of resistors therein for producing a signal varying according to a predetermined function comprising means for supplying power to said network, said power supply means having a high side and a low side, circuit means for connecting said resistors in a series-parallel network including a plurality of switches for connecting one end of each parallel resistor to said low side or to said high side alternatively, the other end of each said parallel resistors being connected to an output circuit, said series-parallel network being composed of a plurality of groups of three resistors, each group having two parallel and one series resistor with one end of all three connected to a common point, circuit means connecting the common point of the first of said groups of resistors to said output and the common point of each succeeding group to the other end of said series resistor in the preceding group, an interpolating potentiometer, means for applying a variable voltage across said potentiometer in accordance with the size of the change in said signal, said last named means including two voltage divider networks having the output of each connected to one end of said potentiometer, said last named networks having their inputs oppositely connected across said power supply, and circuit means including a slider on said potentiometer for adding the output of the potentiometer to said signal in order to interpolate between steps of signal change and provide a smooth output signal that is accurately determined in a digital manner.

4. A digital voltage divider network according to claim 3, wherein said three resistors in each of said groups have a predetermined fixed ratio of resistance values such that the impedance of the network looking from said output remains constant.

5. A digital voltage divider network according to claim 4, wherein said three resistors in each of said groups have a ratio of resistance values in the ratio of 2:3:4 where said series resistor corresponds to the 3 in said ratio, in order to provide a constant impedance for the network looking from said output, irrespective of switching in said network.

6. A voltage divider network for providing digital changes in output voltage from a power supply comprising a plurality of resistors, circuit means for connecting said resistors in a series-parallel network including a plurality of switches for connecting one end of each of said parallel resistors alternatively from one side of said power supply to the other, said resistors having a given ratio of relative resistance values and being connected to provide a constant impedance as seen from the output side of the network.

7. A digital voltage divider network having a plurality of impedances therein for producing a signal varying according to a predetermined function comprising means for supplying power to said network, switching circuit means for connecting predetermined ones of said impedances across said power supply to provide a change in said signal, said switching circuit means including an interpolating potentiometer for making a smooth transition between digital steps of said signal, and means for applying a variable voltage across said potentiometer in accordance with the size of the change in said signal, said last named means including a pair of voltage divider networks and additional switching circuit means for adding the output of the potentiometer to said digital signal steps in order to obtain the signal in digital steps with smooth transition between.

References Cited in the file of this patent

UNITED STATES PATENTS

| | | |
|---|---|---|
| 2,561,140 | Schaefer | July 17, 1951 |
| 2,662,147 | Wiltenchik | Dec. 8, 1953 |